United States Patent
Wigard et al.

(10) Patent No.: US 12,088,400 B2
(45) Date of Patent: Sep. 10, 2024

(54) APPARATUS FOR DOPPLER SHIFT COMPENSATION, CORRESPONDING METHOD AND COMPUTER PROGRAM

(71) Applicant: NOKIA TECHNOLOGIES OY, Espoo (FI)

(72) Inventors: Jeroen Wigard, Klarup (DK); István Zsolt Kovács, Aalborg (DK); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 423 days.

(21) Appl. No.: 17/593,899

(22) PCT Filed: Mar. 29, 2019

(86) PCT No.: PCT/EP2019/057991
§ 371 (c)(1),
(2) Date: Sep. 28, 2021

(87) PCT Pub. No.: WO2020/200396
PCT Pub. Date: Oct. 8, 2020

(65) Prior Publication Data
US 2022/0173799 A1   Jun. 2, 2022

(51) Int. Cl.
*H04W 36/00*  (2009.01)
*G01S 19/29*  (2010.01)
(Continued)

(52) U.S. Cl.
CPC .......... *H04B 7/18513* (2013.01); *G01S 19/29* (2013.01); *H04B 7/18504* (2013.01);
(Continued)

(58) Field of Classification Search
CPC ............ H04B 7/18513; H04B 7/18504; H04B 7/208; G01S 19/29; H04L 2027/0065; H04W 56/0035

See application file for complete search history.

(56) References Cited

U.S. PATENT DOCUMENTS 5,640,166 A * 6/1997 Siwiak .................. H04B 7/208
                                                    455/12.1
6,269,092 B1 * 7/2001 Schilling .............. H04B 7/2628
                                                    370/335

(Continued)

FOREIGN PATENT DOCUMENTS

| EP | 1091506 A2 | 4/2001 |
|---|---|---|
| EP | 3447936 A1 | 2/2019 |
| WO | 2018055512 A2 | 3/2018 |

OTHER PUBLICATIONS

International Search Report and Written Opinion for International Application No. PCT/EP2019/057991, mailed on Nov. 29, 2019, 13 pages.

*Primary Examiner* — Stephen M D Agosta
(74) *Attorney, Agent, or Firm* — Lippes Mathias LLP

(57) ABSTRACT

There is provided an apparatus, said apparatus comprising means for receiving from a network, at a user equipment, Doppler shift information associated with at least one cell of the network as a function of time for at least one area and using the Doppler shift information at the user equipment to compensate for the Doppler shift in communication with the network when the user equipment is in the at least one area.

12 Claims, 9 Drawing Sheets

S1: Receiving from a network, at a user equipment, Doppler shift information associated with at least one cell of the network as a function of time for at least one area S2: Using the Doppler shift information at the user equipment to compensate for the Doppler shift in communication with the network when the user equipment is in the at least one area

(51) Int. Cl.
  *H04B 7/185*   (2006.01)
  *H04B 7/208*   (2006.01)
  *H04L 27/00*    (2006.01)
  *H04W 56/00*    (2009.01)

(52) U.S. Cl.
  CPC ...... *H04B 7/208* (2013.01); *H04L 2027/0065* (2013.01); *H04W 56/0035* (2013.01)

(56) References Cited

U.S. PATENT DOCUMENTS

| | | | | |
|---|---|---|---|---|
| 6,314,126 B1* | 11/2001 | Schilling | | H04W 52/346 370/332 |
| 6,553,007 B1* | 4/2003 | Pekkarinen | | H04B 7/01 342/99 |
| 6,614,860 B1* | 9/2003 | Piirainen | | H04B 7/01 455/63.1 |
| 7,012,973 B1* | 3/2006 | Piirainen | | H04L 25/0224 375/346 |
| 8,125,378 B1* | 2/2012 | Jarpenvaa | | G01S 19/40 342/357.46 |
| 10,547,373 B2* | 1/2020 | Axmon | | H04B 7/18523 |
| 10,715,245 B2* | 7/2020 | Nobbe | | H04B 7/18534 |
| 10,902,376 B2* | 1/2021 | Zuberi | | G06Q 10/087 |
| 2001/0040878 A1* | 11/2001 | Schilling | | H04B 7/2628 370/329 |
| 2002/0150066 A1* | 10/2002 | Schilling | | H04B 1/707 370/335 |
| 2004/0042574 A1* | 3/2004 | Lin | | H04B 7/18513 375/356 |
| 2006/0290565 A1* | 12/2006 | Terashi | | G01S 19/28 342/357.42 |
| 2007/0197165 A1* | 8/2007 | Klotsche | | H04B 7/01 455/63.1 |
| 2007/0213085 A1* | 9/2007 | Fedora | | H04W 56/0035 455/504 |
| 2007/0286311 A1* | 12/2007 | Coyne | | H04L 5/06 375/340 |
| 2009/0029657 A1* | 1/2009 | Sakaishi | | H04W 56/0035 455/113 |
| 2010/0109936 A1* | 5/2010 | Levy | | G08G 5/0013 340/961 |
| 2010/0167728 A1* | 7/2010 | Venkitaraman | | H04W 36/04 455/434 |
| 2010/0173592 A1* | 7/2010 | Yamazaki | | H04B 7/0615 455/69 |
| 2010/0317293 A1* | 12/2010 | Yokoyama | | H04W 56/0035 455/63.1 |
| 2012/0083299 A1* | 4/2012 | Kruglick | | H04B 7/01 455/501 |
| 2012/0315915 A1* | 12/2012 | Ohm | | H04W 36/08 455/440 |
| 2013/0143503 A1* | 6/2013 | Li | | H04W 36/0058 455/63.1 |
| 2013/0229305 A1* | 9/2013 | Nayyar | | G01S 19/30 342/357.63 |
| 2015/0116353 A1* | 4/2015 | Miura | | G02B 27/0075 345/632 |
| 2015/0133091 A1* | 5/2015 | Baldwin | | H04W 64/006 455/414.1 |
| 2015/0192696 A1* | 7/2015 | Platzer | | G01W 1/10 342/26 A |
| 2015/0282144 A1* | 10/2015 | Tomeba | | H04B 7/0617 370/329 |
| 2016/0219487 A1* | 7/2016 | Khawer | | H04W 36/26 |
| 2017/0055273 A1* | 2/2017 | Sharma | | H04W 72/542 |
| 2017/0188322 A1* | 6/2017 | Calmettes | | G01S 5/0231 |
| 2018/0143328 A1* | 5/2018 | Ries | | H04W 64/003 |
| 2018/0219700 A1* | 8/2018 | Åström | | H04L 5/0048 |
| 2018/0241464 A1* | 8/2018 | Michaels | | H04B 7/18539 |
| 2019/0029026 A1* | 1/2019 | Yun | | H04W 72/541 |
| 2020/0196263 A1* | 6/2020 | Heyn | | H04W 56/0005 |
| 2021/0250740 A1* | 8/2021 | Zielinski | | H04W 4/08 |
| 2022/0150818 A1* | 5/2022 | Liberg | | H04B 7/18539 |
| 2022/0303974 A1* | 9/2022 | Cui | | H04W 76/15 |

\* cited by examiner

APPARATUS FOR DOPPLER SHIFT COMPENSATION, CORRESPONDING METHOD AND COMPUTER PROGRAM

CROSS-REFERENCE TO RELATED APPLICATIONS

This application is a national stage entry of International Application No. PCT/EP2019/057991, filed Mar. 29, 2019, entitled "APPARATUS FOR DOPPLER SHIFT COMPENSATION, CORRESPONDING METHOD AND COMPUTER PROGRAM" which is hereby incorporated by reference in its entirety.

FIELD

The present application relates to a method, apparatus, system and computer program and in particular but not exclusively to signaling for Doppler and latency compensation in Non-Terrestrial Networks.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus comprising means for receiving from a network, at a user equipment, Doppler shift information associated with at least one cell of the network as a function of time for at least one area and using the Doppler shift information at the user equipment to compensate for the Doppler shift in communication with the network when the user equipment is in the at least one area.

The apparatus may comprise means for, at the user equipment, determining Doppler shift information associated with the at least one cell for the at least one area and providing the determined Doppler shift information to the network.

The apparatus may comprise means for receiving the Doppler shift information from the network using at least one of radio resource control signalling, broadcast signalling, multicast signalling and groupcast signalling.

The broadcast signalling may be broadcast per the at least one area.

The apparatus may comprise means for providing a request for the Doppler shift information to the network from the user equipment and receiving the Doppler shift information from the network at the user equipment in response to the request.

The at least one cell may be associated with a low Earth orbit satellite.

The apparatus may comprise means for receiving the Doppler shift information from the network as a function of at least one of user equipment speed and direction.

The apparatus may comprise means for using the Doppler shift information to compensate for the Doppler shift when performing measurements or an initial access procedure.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The apparatus may comprise means for: determining which set of parameters to use in communication with the network and providing an indication to the network of the set of parameters used in communication with the network.

In a second aspect, there is provided an apparatus, said apparatus comprising means for determining Doppler shift information associated with at least one cell of a network as a function of time for at least one area and providing the Doppler shift information to a user equipment for use in communicating with the network when the user equipment is in the at least one area.

The apparatus may comprise means for determining that the user equipment is in the first area based on at least one of global navigation satellite system information and previous Doppler shift information received from the user equipment.

The apparatus may comprise means for receiving Doppler shift information associated with the at least one cell for the at least one area from the user equipment, the Doppler shift information determined at the user equipment.

The apparatus may comprise means for providing the Doppler shift information to the user equipment using at least one of radio resource control signalling, broadcast signalling, multicast signalling and groupcast signalling.

The broadcast signalling may be broadcast per the at least one area.

The apparatus may comprise means for receiving a request for the Doppler shift information from the user equipment and providing the Doppler shift information from the network to the user equipment in response to the request.

The at least one cell may be associated with a low Earth orbit satellite.

The apparatus may comprise means for providing the Doppler shift information to the user equipment as a function of at least one of user equipment speed and direction.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The apparatus may comprise means for receiving an indication from the user equipment of the set of parameters used in communication with the network.

In a third aspect there is provided a method, the method comprising receiving from a network, at a user equipment, Doppler shift information associated with at least one cell of the network as a function of time for at least one area and using the Doppler shift information at the user equipment to compensate for the Doppler shift in communication with the network when the user equipment is in the at least one area.

The method may comprise, at the user equipment, determining Doppler shift information associated with the at least one cell for the at least one area and providing the determined Doppler shift information to the network.

The method may comprise receiving the Doppler shift information from the network using at least one of radio resource control signalling, broadcast signalling, multicast signalling and groupcast signalling.

The broadcast signalling may be broadcast per the at least one area.

The method may comprise providing a request for the Doppler shift information to the network from the user equipment and receiving the Doppler shift information from the network at the user equipment in response to the request.

The at least one cell may be associated with a low Earth orbit satellite.

The method may comprise receiving the Doppler shift information from the network as a function of at least one of user equipment speed and direction.

The method may comprise using the Doppler shift information to compensate for the Doppler shift when performing measurements or an initial access procedure.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The method may comprise determining which set of parameters to use in communication with the network and providing an indication to the network of the set of parameters used in communication with the network.

In a fourth aspect there is provided a method comprising determining Doppler shift information associated with at least one cell of a network as a function of time for at least one area and providing the Doppler shift information to a user equipment for use in communicating with the network when the user equipment is in the at least one area.

The method may comprise determining that the user equipment is in the first area based on at least one of global navigation satellite system information and previous Doppler shift information received from the user equipment.

The method may comprise receiving Doppler shift information associated with the at least one cell for the at least one area from the user equipment, the Doppler shift information determined at the user equipment.

The method may comprise providing the Doppler shift information to the user equipment using at least one of radio resource control signalling, broadcast signalling, multicast signalling and groupcast signalling.

The broadcast signalling may be broadcast per the at least one area.

The method may comprise receiving a request for the Doppler shift information from the user equipment and providing the Doppler shift information from the network to the user equipment in response to the request.

The at least one cell may be associated with a low Earth orbit satellite.

The method may comprise providing the Doppler shift information to the user equipment as a function of at least one of user equipment speed and direction.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The method may comprise receiving an indication from the user equipment of the set of parameters used in communication with the network.

In a fifth aspect there is provided an apparatus comprising: at least one processor and at least one memory including a computer program code, the at least one memory and computer program code configured to, with the at least one processor, cause the apparatus at least to: receive from a network, at a user equipment, Doppler shift information associated with at least one cell of the network as a function of time for at least one area and use the Doppler shift information at the user equipment to compensate for the Doppler shift in communication with the network when the user equipment is in the at least one area.

The apparatus may be configured to, at the user equipment, determine Doppler shift information associated with the at least one cell for the at least one area and provide the determined Doppler shift information to the network.

The apparatus may be configured to receive the Doppler shift information from the network using at least one of radio resource control signalling, broadcast signalling, multicast signalling and groupcast signalling.

The broadcast signalling may be broadcast per the at least one area.

The apparatus may be configured to provide a request for the Doppler shift information to the network from the user equipment and receive the Doppler shift information from the network at the user equipment in response to the request.

The at least one cell may be associated with a low Earth orbit satellite.

The apparatus may be configured to receive the Doppler shift information from the network as a function of at least one of user equipment speed and direction.

The apparatus may be configured to use the Doppler shift information to compensate for the Doppler shift when performing measurements or an initial access procedure.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The apparatus may be configured to determine which set of parameters to use in communication with the network and provide an indication to the network of the set of parameters used in communication with the network.

In a sixth aspect there is provided an apparatus comprising at least one processor and at least one memory including a computer program code, the at least one memory and computer program code configured to, with the at least one processor, cause the apparatus at least to: determine Doppler shift information associated with at least one cell of a network as a function of time for at least one area and provide the Doppler shift information to a user equipment for use in communicating with the network when the user equipment is in the at least one area.

The apparatus may be configured to determine that the user equipment is in the first area based on at least one of global navigation satellite system information and previous Doppler shift information received from the user equipment.

The apparatus may be configured to receive Doppler shift information associated with the at least one cell for the at least one area from the user equipment, the Doppler shift information determined at the user equipment.

The apparatus may be configured to provide the Doppler shift information to the user equipment using at least one of radio resource control signalling, broadcast signalling, multicast signalling and groupcast signalling.

The broadcast signalling may be broadcast per the at least one area.

The apparatus may be configured to receive a request for the Doppler shift information from the user equipment and provide the Doppler shift information from the network to the user equipment in response to the request.

The at least one cell may be associated with a low Earth orbit satellite.

The apparatus may be configured to provide the Doppler shift information to the user equipment as a function of at least one of user equipment speed and direction.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The apparatus may be configured to receive an indication from the user equipment of the set of parameters used in communication with the network.

In a seventh aspect there is provided a computer readable medium comprising program instructions for causing an apparatus to perform at least the following receiving from a network, at a user equipment, Doppler shift information associated with at least one cell of the network as a function of time for at least one area and using the Doppler shift information at the user equipment to compensate for the Doppler shift in communication with the network when the user equipment is in the at least one area.

The apparatus may be caused to perform, at the user equipment, determining Doppler shift information associated with the at least one cell for the at least one area and providing the determined Doppler shift information to the network.

The apparatus may be caused to perform receiving the Doppler shift information from the network using at least one of radio resource control signalling, broadcast signalling, multicast signalling and groupcast signalling.

The broadcast signalling may be broadcast per the at least one area.

The apparatus may be caused to perform providing a request for the Doppler shift information to the network from the user equipment and receiving the Doppler shift information from the network at the user equipment in response to the request.

The at least one cell may be associated with a low Earth orbit satellite.

The apparatus may be caused to perform receiving the Doppler shift information from the network as a function of at least one of user equipment speed and direction.

The apparatus may be caused to perform using the Doppler shift information to compensate for the Doppler shift when performing measurements or an initial access procedure.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The apparatus may be caused to perform determining which set of parameters to use in communication with the network and providing an indication to the network of the set of parameters used in communication with the network.

In an eighth aspect there is provided a computer readable medium comprising program instructions for causing an apparatus to perform at least the following determining Doppler shift information associated with at least one cell of a network as a function of time for at least one area and providing the Doppler shift information to a user equipment for use in communicating with the network when the user equipment is in the at least one area.

The apparatus may be caused to perform determining that the user equipment is in the first area based on at least one of global navigation satellite system information and previous Doppler shift information received from the user equipment.

The apparatus may be caused to perform receiving Doppler shift information associated with the at least one cell for the at least one area from the user equipment, the Doppler shift information determined at the user equipment.

The apparatus may be caused to perform providing the Doppler shift information to the user equipment using at least one of radio resource control signalling, broadcast signalling, multicast signalling and groupcast signalling.

The broadcast signalling may be broadcast per the at least one area.

The apparatus may be caused to perform receiving a request for the Doppler shift information from the user equipment and providing the Doppler shift information from the network to the user equipment in response to the request.

The at least one cell may be associated with a low Earth orbit satellite.

The apparatus may be caused to perform providing the Doppler shift information to the user equipment as a function of at least one of user equipment speed and direction.

The Doppler shift information may comprise at least one set of parameters associated with a first cell, the parameters defining at least one of frequency offset and time offset of the first cell.

The Doppler shift information may comprise at least two sets of parameters, each set of parameters associated with a different area. The apparatus may be caused to perform receiving an indication from the user equipment of the set of parameters used in communication with the network.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
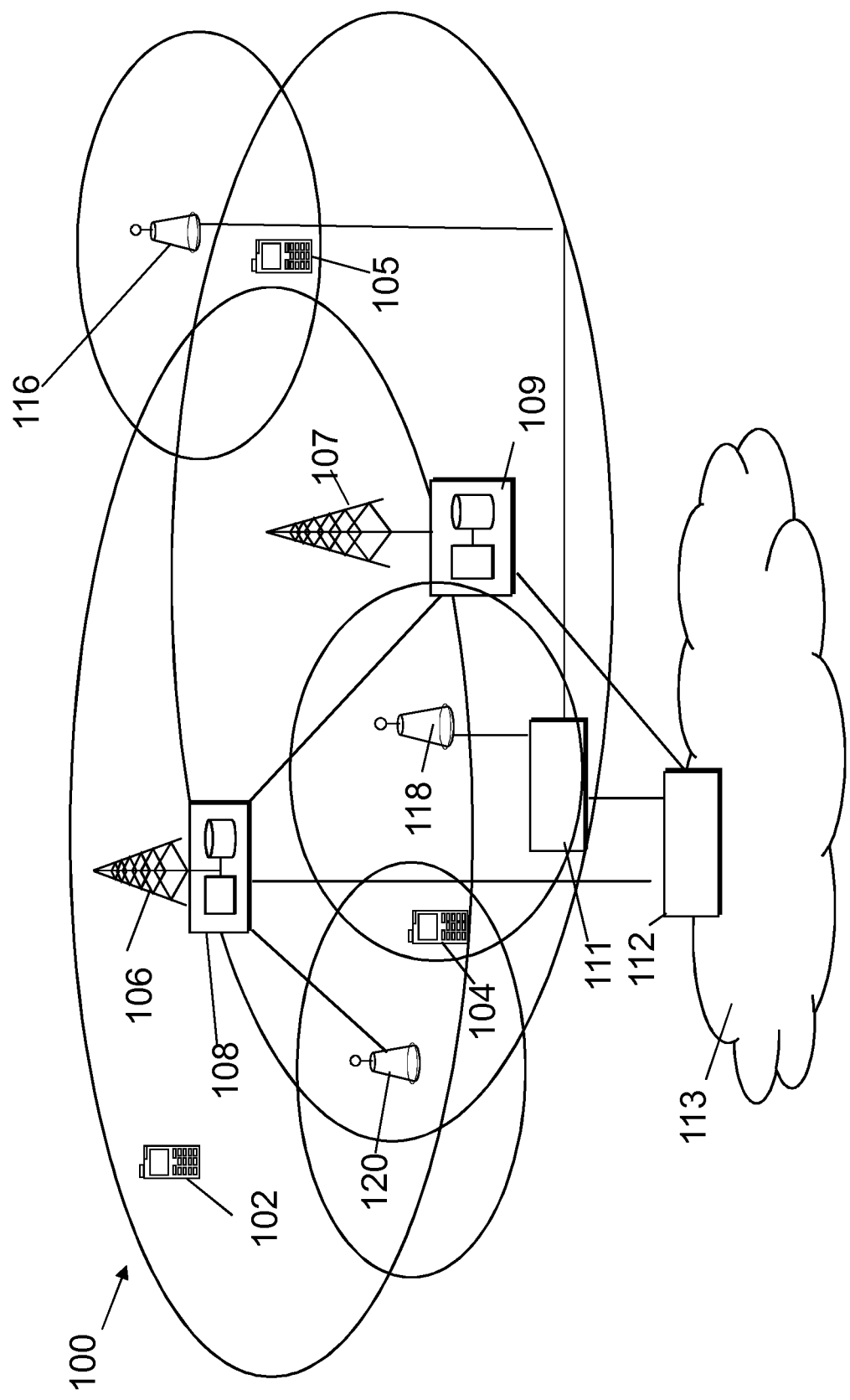
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. New functions are defined in the 5G system architecture, including an Access Management Function (AMF), Session Management Function (SMF), User Plane Function (UPF), among other network functions in the Next Generation Core (NGC). The 5G System supports new capabilities, including network slicing which may better tailor networks to application requirements and provide virtual networks for tenants. It also uses a services-based architecture the provides greater flexibility for introducing new services and features compared to the EPC which relied on fixed, peer-peer reference points. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. NR may also support lower latency for air-interface transmission due to revisions in physical and MAC layer protocols.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, by a Centralized Unit (CU) at least partly, in a server, host or node operationally coupled to Distributed Unit (DU), which may connect to a remote radio head (RRH). It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) which may be a PSA (PDU Session Anchor) providing an anchor point for user IP, Ethernet or Unstructured user data sessions. The UPF may be responsible for forwarding frames back and forth between the DN (data network) and the gNBs through tunnels established over transport networks towards the UE(s) that want to exchange traffic with the DN.

The UPF is controlled by an SMF (Session Management Function) that receives policies from a PCF (Policy Control Function). The CN may also include an AMF (Access & Mobility Function) which terminates the control plane interface with the RAN and manages UE registrations and mobility.

Figure 2:
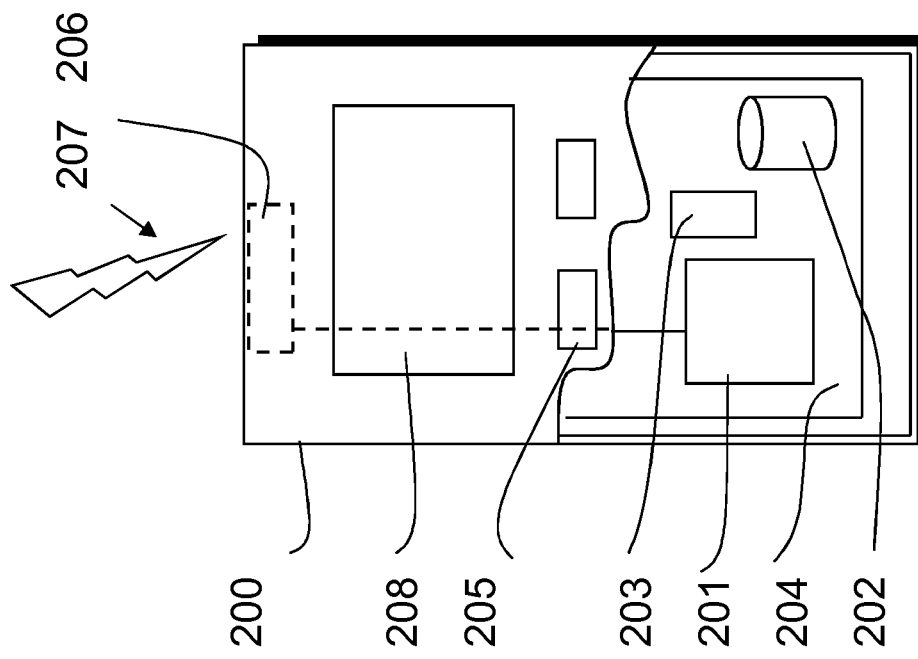
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The Internet of Things (IoT) concept extends connectivity from user terminals such as mobile devices to traditionally non-internet-enabled devices comprising, for example, sensors, control system and automated systems.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A communication device may be a modem integrated on an airplane and served by a terrestrial or non-terrestrial network.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
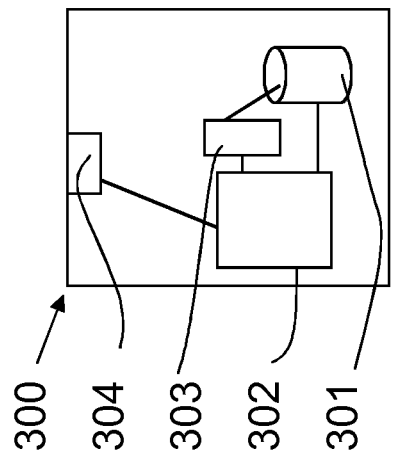
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus, such as a CU Control Plane (CU-CP) as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The 3GPP Non-Terrestrial Networks (NTN) (5G NR) SI [38.821] contains a number of different NTN scenarios. Some of the scenarios are based on low Earth orbit (LEO) satellites. It has been recognized that there may be at least two issues when using LEO satellites for NR provisioning.

A large Doppler frequency shift, due to the movement of the satellites (up to 28000 km/h for LEO) and increased latency between RAN and UE due to the distance between base station and UE.

Both the Doppler frequency shift and the latency depend on a UE position, and both are time varying due to the fact that the satellites move.

For the case of the low earth orbit (LEO) satellite channel the fading and Doppler effects may be significant and lead to acquisition times which are considerably longer than those indicated for an AWGN channel. The typical Doppler shift values in NTN scenario may be found in TR38.811 Section 5.3. As an example, for LEO satellite scenarios Doppler shifts up to +/−45 KHz have been identified for the 2 GHz frequency band. For both initial access, and for handover/cell reselection measurements (RSRP, RSRQ) this may lead to longer access times, as the exact Doppler frequency needs to be estimated and compensated before the actual data/signalling/measurements can be initiated.

To avoid this, the effective value of Doppler shift may be estimated and used to eliminate (or minimize) the need to search the Doppler dimension.

The principles of Doppler compensation are understood. In the TR 38.811 Table 8.4.2-1 the impact of large Doppler shifts is listed as one item to be evaluated for 5G NR. It is known how to calculate the Doppler frequency and, for cellular systems, there are methods to compensate for the Doppler shift. Typically a search is used over a certain frequency space. Due to the speed of LEO satellites this may be time consuming.

Doppler/Delay compensation techniques may be implemented especially for Non GEO satellites.

A first technique is a Global Navigation Satellite System (GNSS) based technique. A User Equipment, equipped with a GNSS receiver, determines its position and the universal time. Thanks to pre-loaded/updated ephemeris of the satellite constellation, which may be theoretical or actual, the UE is able to compute the position and motion of the possible serving satellites such that the UE can determine the Doppler shift and variation rate as well as the absolute Delay and Delay variation.

For LEO satellites, the orbit of each satellite is known and propagation is typically free space propagation. The Doppler frequency for each location on earth may be pre-calculated at each time instant when the location and movement of the satellite and UE are known [TR38.811 Section 8.4.2].

Non GNSS based techniques may also be envisaged and implemented

The following describes a situation where a UE is a low cost IoT device, which requires minimised energy consumption, and may not have GNSS capabilities. However, even for a UE with a GNSS function, GNSS may not be reliable may be jammed, or tampered with. The following is thus also applicable in this case where a UE has a GNSS function.

The method may avoid long acquisition time of and/or reducing the associated processing of the synchronization channels (such as SSB, CSI-RS) for gaining downlink synchronisation to a cell for both initial access and mobility measurements.

Figure 4:
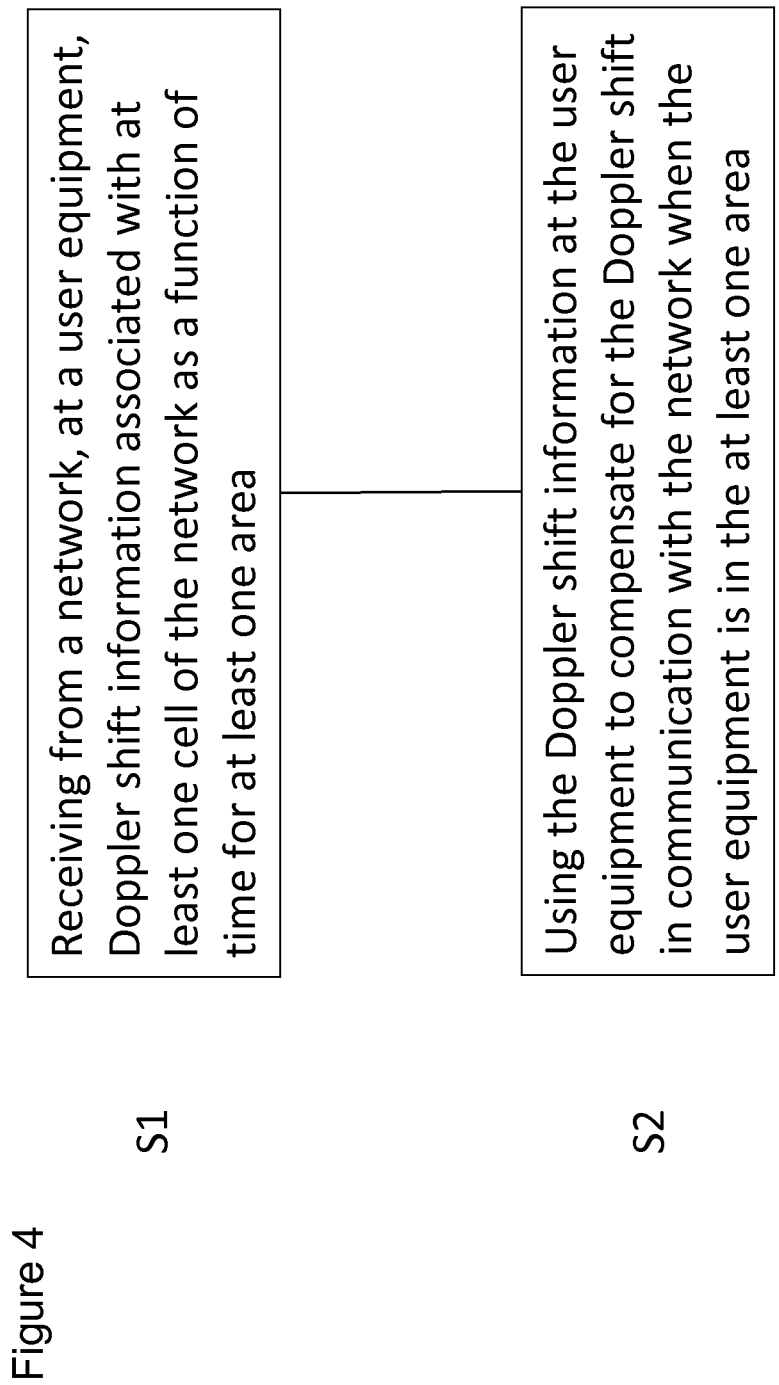
FIG. 4 shows a flowchart of a method according to an example embodiment.

FIG. 4 shows a flowchart of a method according to an example embodiment. In a first step, S1, the method comprises receiving from a network, at a user equipment, Doppler shift information associated with at least one cell of the network as a function of time for at least one area.

In a second step, S2, the method comprises using the Doppler shift information at the user equipment to compensate for the Doppler shift in communication with the network, when the user equipment is in the at least one area.

Figure 5:
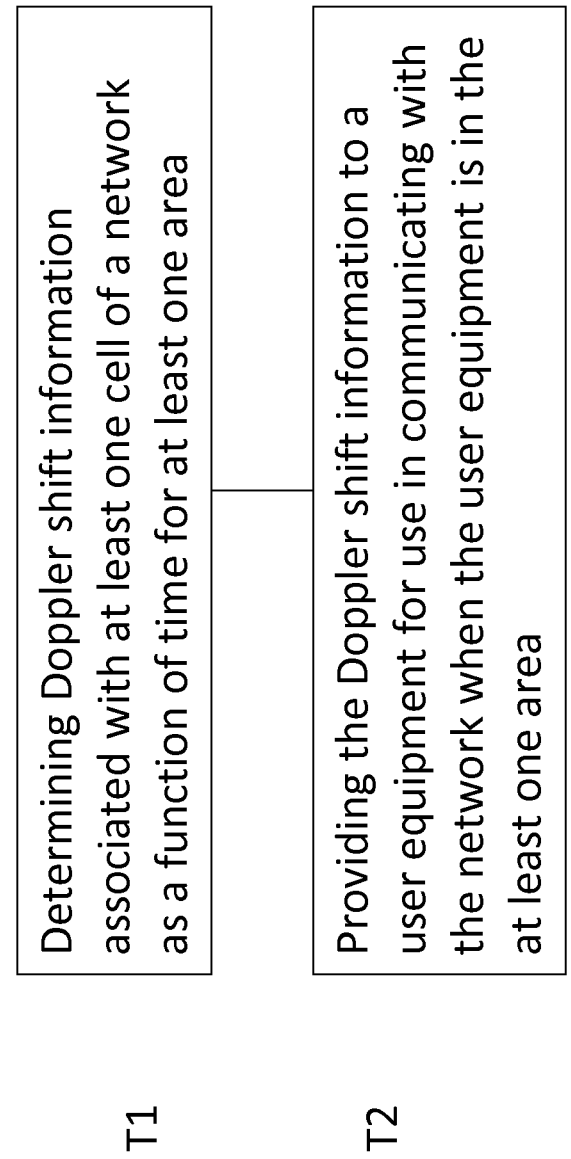
FIG. 5 shows a flowchart of a method according to an example embodiment.

FIG. 5 shows a flowchart of a method according to an example embodiment which may be performed at a network (e.g., in RAN or CN).

In a first step, T1, the method comprises determining Doppler shift information associated with at least one cell of a network as a function of time for at least one area.

In a second step, T2, the method comprises providing the Doppler shift information to a user equipment for use in communicating with the network when the user equipment is in the at least one area The at least one area may be a geographical area. The geographical area may be defined in two or three dimensions. For example, a 3-D geographical area accounts for the position of a device mounted on an aeroplane.

The Doppler shift information may comprise a time dependent list of values per area (which may be referred to as a set of Doppler compensation parameters). The values, or parameters, may comprise at least one of the Doppler frequency shift and time offset per candidate cell. The Doppler shift information may also include an indication of the associated cell, Doppler area and validity. The Doppler shift information may also be indicated per area for different UE speed and direction ranges.

The at least one cell may be associated with a satellite. The satellite may be a LEO satellite.

The UE may store the Doppler shift information for future use per area

The UE may use the Doppler shift information received from the network to compensate for the Doppler shift per satellite when the UE performs initial access or measurements. The knowledge of the Doppler shift information may be used by the UE to synchronise to the candidate cells faster, since the UE may skip, or shorten the time for, finding the right frequency and timing. This may speed up neighbouring cell search, neighbouring cell measurements and initial access procedures performed by the UE.

If the Doppler shift is not 100% accurate due, for example, to high velocity movement of the UE or an out of date Doppler shift estimation, Doppler compensation may still be performed by using the Doppler shift information as a starting point. The inaccurate Doppler shift information may compensate the largest part of the actual Doppler shift, and so shorten acquisition and access (or handover) times for the UE.

The network may determine the Doppler shift values for all areas and provide the UE with Doppler shift information for all areas. Alternatively, or in addition, the network can, based on information about the location of a UE (at an area level) provide Doppler shift information for those areas or area where the UE is located.

The network may determine that the user equipment is in the first area based on at least one of GNSS information or another location method. The UE location may also be estimated through previous estimates of the Doppler shifts. Potentially only the previous Doppler shift value is known, which may then lead to 2 potential locations, symmetric around the satellite orbital plane.

The UE may provide the network with the estimated initial Doppler frequency for a given cell at a given time (or preferably for multiple cells), which the network can map back to an area at that time.

If the network is in doubt of the UE location (a certain Doppler frequency for a certain moving satellite will ideally correspond to two 'symmetric' UE location points and movement vectors), then the network may provide the user equipment with multiple estimated initial Doppler frequencies, i.e. more than one value per cell, representing different areas. That is, the Doppler shift information may comprise two sets of parameters, each set of parameters associated with a different area.

The UE may identify its area based on its location or receive an indication of its area from the network and apply the initial Doppler shift adjustment associated to its area.

The method may comprise providing a request for the Doppler shift information to the network from the user equipment and receiving the Doppler shift information from the network at the user equipment in response to the request. For example, the UE may request the Doppler shift information for a given area, when Doppler shift information for a given area is not stored at the UE.

The size of the at least one area is a tradeoff between accuracy of the initial Doppler shift, UE capability to compensate and signaling overhead. The network is aware of the orbits and location of each satellite and cell, plus each cell's coverage area/footprint on earth. The speed and direction of each satellite are known, so a 'map' (i.e., Doppler shift per area) may be built, assuming each UE is stationary (relative to Earth), as a function of time for each satellite/cell.

The method provides initial Doppler shift information from the network to a UE. For compensation of the UE speed, a normal synchronization procedure may be used. However if speed and direction of the UE are known by the network this may also be applied in the initial Doppler shift determination by the network. The network may provide the Doppler shift information to the user equipment as a function of at least one user equipment speed and direction.

The Doppler shift information may be provided to the UE using dedicated signalling, e.g., RRC signalling. The Doppler shift information may be regularly updated for the UE, e.g., during the RRC connection (re)establishment, RRC setup/reconfiguration and RRC connection release. The information may then be used by the UE in the follow up access or handover instances.

Alternatively, or in addition, the Doppler shift information may be provided in response to a request from the UE. If the UE notices that the current initial Doppler offset is not sufficient, i.e., the UE needs to adjust by more than a certain amount of Doppler after the initial offset, the UE may send a request to the network for updated values.

Although the signalling has described as unicast, the signalling from the network to the UEs may also be based on broadcast, multicast or groupcast.

Signalling may be broadcast per area through broadcast information. If the UE knows its position (e.g., through GNSS) the UE can map to the Doppler shift information in the broadcast signalling associated with its area.

The method may comprise determining, at the user equipment, Doppler shift information associated with the at least one cell for the at least one area and providing the determined Doppler shift information to the network.

When the Doppler shift information comprises two or more sets of compensation parameters, each set of compensation associated with a different area the method may comprise providing an indication to the network of the set of parameters used in communication with the network. For example, where multiple Doppler shift values are provided for a given area, the UE may provide an indication to the network of which set was most accurate. Alternatively, the UE may provide an indication to the network of the overall Doppler shift the UE is experiencing. The network may use this information to update the location and/or speed plus direction estimation of the UE.

Some low cost UE may not be able to compensate for the Doppler offset if the initial Doppler shift is very much away from the real Doppler shift. In that case the UE may try and use the other initial Doppler shift, if provided by the network. If the UE capable of synchronizing anyway, it will take longer, but the UE may provide feedback to the network as described above such the network can provide better information at the next opportunity.

Figure 6:
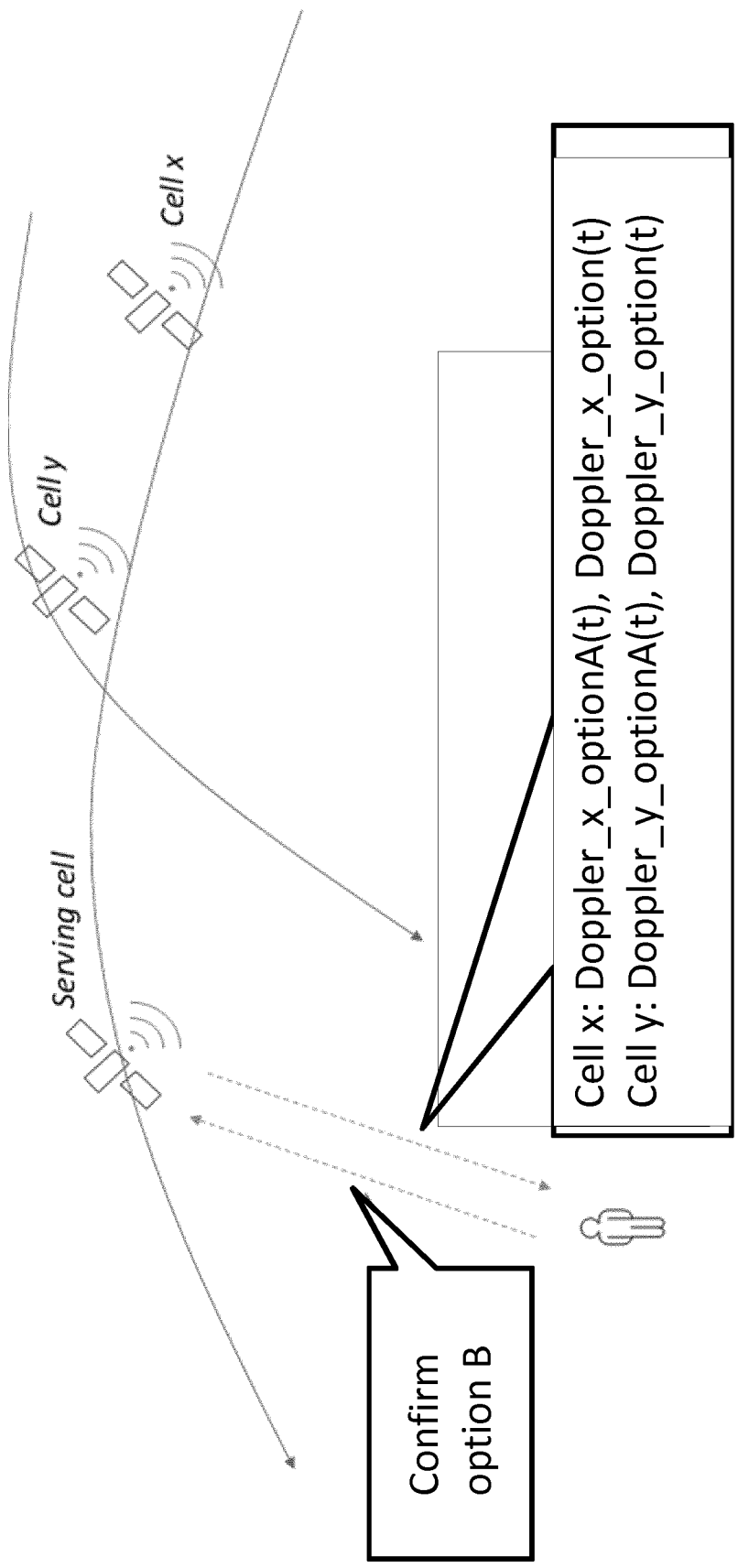
FIG. 6 shows a schematic diagram of a user and three satellites according to an example.

FIG. 6 shows a schematic diagram of signalling between a serving cell of a NTN and a user. Two possible Doppler values as functions of time (shown as option A and option B) are shown for 2 candidate cells, Cell x and Cell y. Once the UE has calculated which of the two points, i.e. which of the two Doppler frequencies, is the correct one the UE provides an indication of the correct frequency back to the network.

Figure 7:
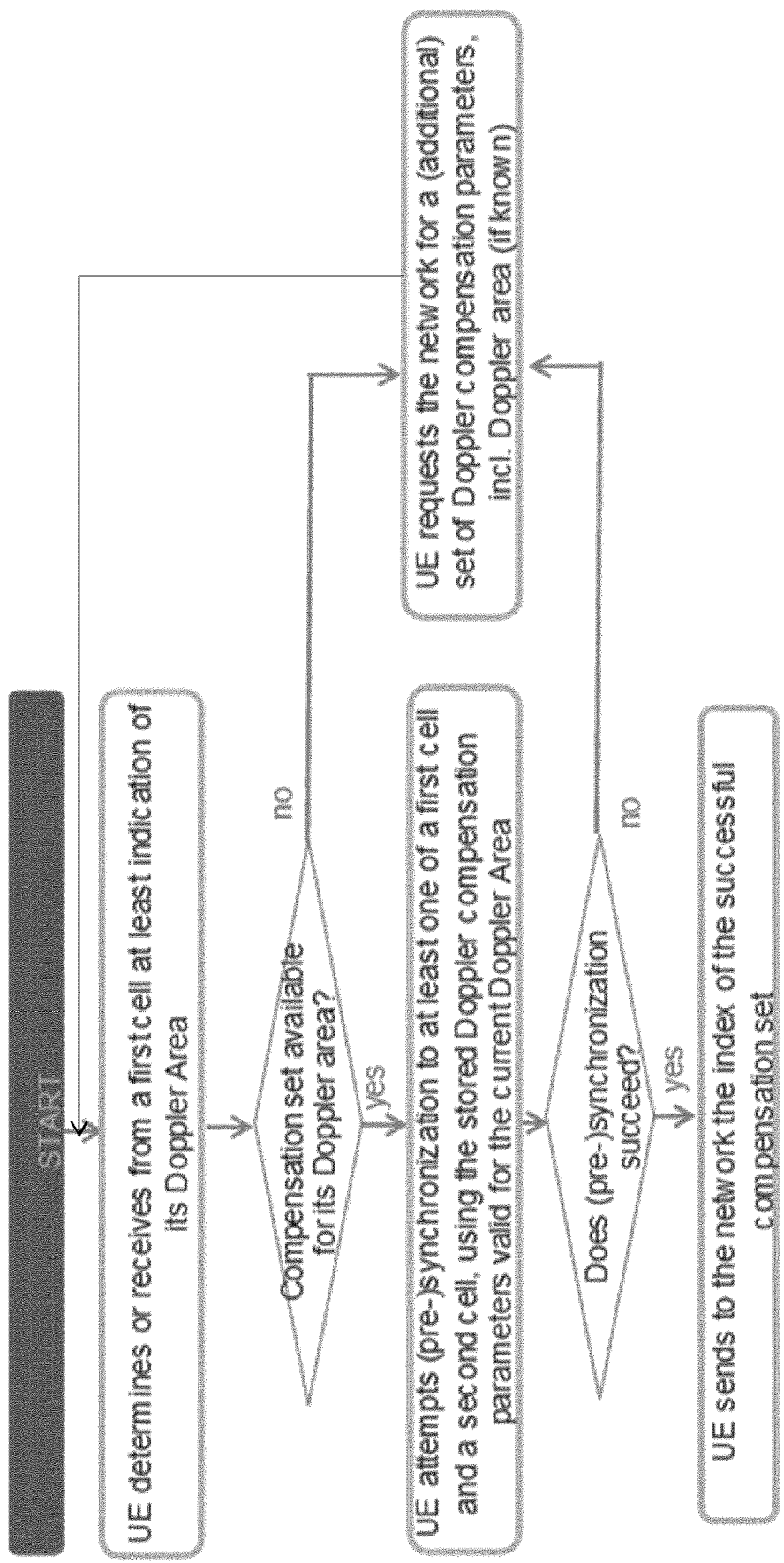
FIG. 7 shows a flowchart of a method according to an example embodiment.

FIG. 7 shows a flowchart of a method according to an example embodiment, which may be applied to the system shone in FIG. 6.

In a first step, the UE determines, or receives from a first cell, at least an indication of the UE's Doppler Area. The UE then determines if the set of Doppler compensation parameters (i.e., Doppler shift information) is available for its Doppler area at the UE. If so, the UE attempts (pre-)synchronisation to at least one of a first cell and a second cell using the stored Doppler compensation parameters valid associated with the current Doppler area. If the (pre-)synchronisation succeeds, the UE sends to the network an index of the successful compensation set. If the compensation set is not available, or the (pre-)synchronisation does not succeed, the UE requests an additional set of Doppler compensation parameters (including its Doppler area if known). The Doppler area may comprise the 3-D geographical area described previously.

Figure 8:
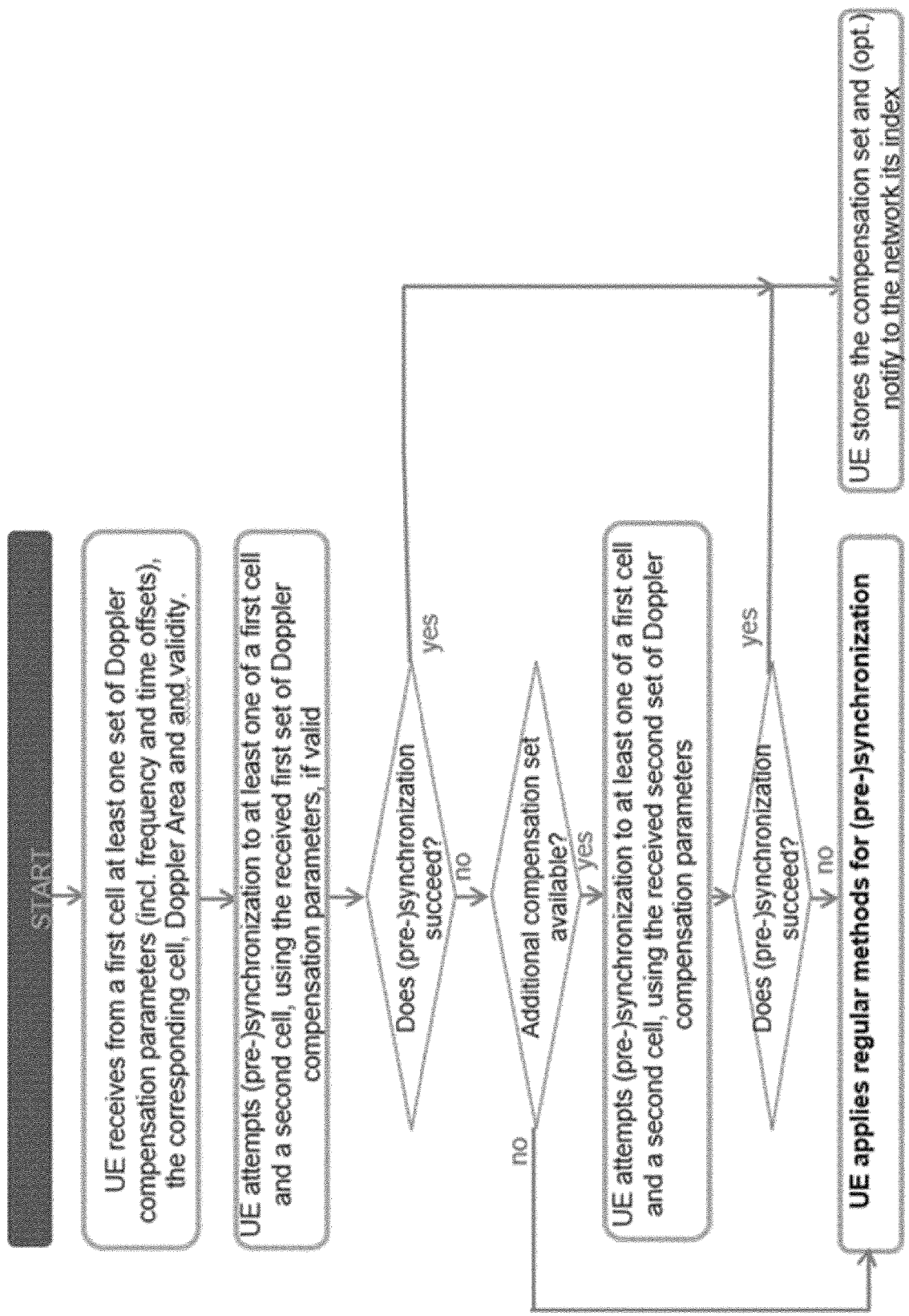
FIG. 8 shows a flowchart of a method according to an example embodiment.

FIG. 8 shows a flowchart for an alternative method according to an example embodiment.

In a first step, the UE receives from a first cell at least one set of Doppler compensation parameters (i.e. Doppler shift information). The UE then attempts (pre-)synchronisation to at least one of a first cell and a second cell, using the received first set of Doppler compensation parameters, if valid. If (pre-) synchronisation succeeds, the UE stores the set of compensation parameters and, optionally, may notify the network of the index of the compensation set.

If (pre-) synchronisation does not succeed, the UE checks whether a second set of Doppler compensation parameters is available and if so attempts (pre-)synchronisation to at least one of a first cell and a second cell, using the received second set of Doppler compensation parameters. If this (pre-) synchronisation is successful, the UE stores the set of compensation parameters and may, optionally, may notify the network of the index of the compensation set.

If the second (pre-) synchronisation attempt is not successful, the UE applies regular methods for (pre-) synchronisation.

Figure 9:
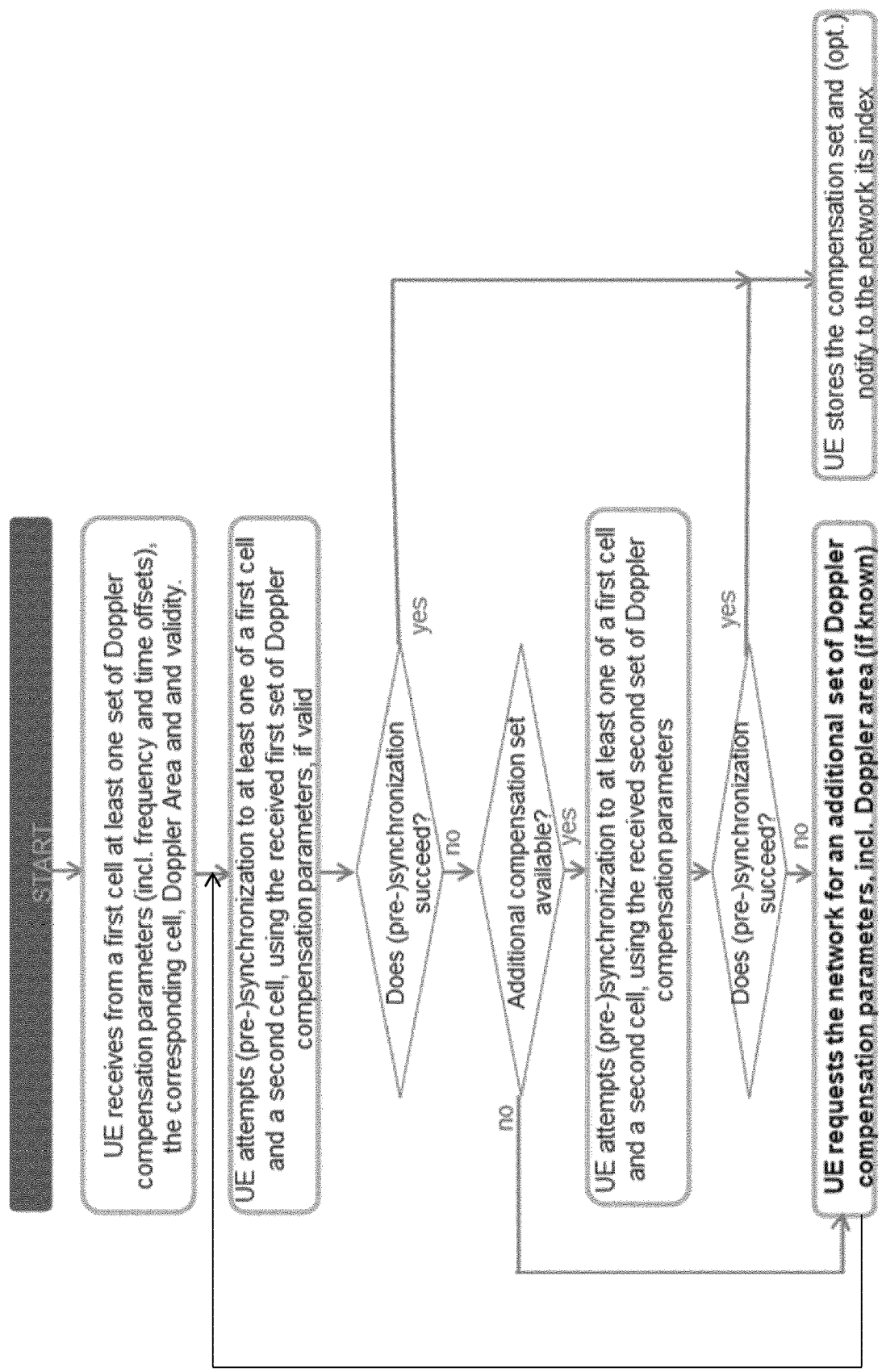
FIG. 9 shows a flowchart of a method according to an example embodiment.

FIG. 9 shows a flowchart of a method according to an example embodiment. The method follows the same steps as that of FIG. 8. However, if the second (pre-) synchronisation attempt is not successful, the UE provides a request to the network for an additional set of Doppler compensation parameters and includes the Doppler area, if known.

The method may be applicable for NTN networks with LEO satellites, since the satellites can move with relatively high speeds (28000 km/h) which may leading to a large Doppler spread and the cells may have a large coverage area, leading to different time offsets in a cell. The proposed mechanism may allow the network to provide UEs with Doppler shift information without GNSS-based knowledge of their movement and geographical location.

Providing the UEs with Doppler shift information from the network may cause faster radio synchronization, fewer radio measurements, faster initial access and/or faster handover (when RACH based handover is used).

Less synchronization processing needed at the UE leading to lower energy consumption by the UE.

There is no need for UE GNSS-based location/movement reporting to the network.

The method may be applied to more backwards compatible UEs, i.e. likely lower cost, since the UE can rely on the regular Doppler compensation range after applying the method.

The method may be implemented in a user equipment as described with reference to FIG. 2 or a control apparatus as described with reference to FIG. 3.

An apparatus may comprise means for receiving from a network, at a user equipment, Doppler shift information associated with at least one cell of the network as a function of time for at least one area and using the Doppler shift information at the user equipment to compensate for the Doppler shift in communication with the network when the user equipment is in the at least one area.

Alternatively, or in addition, an apparatus may comprise means for determining Doppler shift information associated with at least one cell of a network as a function of time for at least one area and providing the Doppler shift information to a user equipment for use in communicating with the network when the user equipment is in the at least one area.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to NTN, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus, comprising:
   at least one processor; and
   at least one memory including computer program code;
      the at least one memory and the computer program code configured to cause the apparatus at least to:
      receive from a network, at a user equipment, Doppler shift information associated with at least one cell of the network as a function of time for at least one area; and
      use the Doppler shift information at the user equipment to compensate for the Doppler shift in communication with the network when the user equipment is in the at least one area,
   wherein the at least one processor and the computer program code are further configured to cause the apparatus to:
   receive the Doppler shift information from the network using radio resource control signalling, broadcast signalling, multicast signalling and groupcast signalling, wherein the broadcast signalling is broadcast per the at least one area;
   determine Doppler shift information associated with the at least one cell for the at least one area; and
   provide the determined Doppler shift information to the network, and
   wherein the Doppler shift information comprises a set of Doppler compensation parameters comprising a time dependent list of values per area, the parameters comprising the Doppler frequency shift and time offset per candidate cell, wherein the Doppler shift information further comprises an indication of the associated cell, Doppler area and validity, and wherein the Doppler shift information is indicated per area for different UE speed and direction ranges.

2. The apparatus according to claim 1, wherein the at least one processor and the computer program code are configured to cause the apparatus to:
   provide a request for the Doppler shift information to the network from the user equipment; and
   receive the Doppler shift information from the network at the user equipment in response to the request.

3. The apparatus according to claim 1, wherein the at least one processor and the computer program code are configured to cause the apparatus to:
   use the Doppler shift information to compensate for the Doppler shift when performing measurements and an initial access procedure.

4. The apparatus according to claim 1, wherein the Doppler shift information comprises at least one set of parameters associated with a first cell, the parameters defining at least one of frequency offset and time offset of the first cell.

5. The apparatus according to claim 1, wherein the Doppler shift information comprises at least two sets of parameters, each set of parameters associated with a different area, wherein the at least one processor and the computer program code are configured to cause the apparatus to:
   determine which set of parameters to use in communication with the network; and
   provide an indication to the network of the set of parameters used in communication with the network.

6. An apparatus comprising:
   at least one processor; and
   at least one memory including computer program code;
      the at least one memory and the computer program code configured to cause the apparatus at least to:
      determine Doppler shift information associated with at least one cell of a network as a function of time for at least one area; and
      provide the Doppler shift information to a user equipment for use in communicating with the network when the user equipment is in the at least one area,
   wherein the at least one processor and the computer program code are further configured to cause the apparatus to:
   determine that the user equipment is in the first area based on global navigation satellite system information and previous Doppler shift information received from the user equipment;
   receive Doppler shift information associated with the at least one cell for the at least one area from the user equipment, the Doppler shift information determined at the user equipment;
   provide the Doppler shift information to the user equipment using radio resource control signalling, broadcast signalling, multicast signalling and groupcast signalling, wherein the broadcast signalling is broadcast per the at least one area;
   wherein the Doppler shift information comprises a set of Doppler compensation parameters comprising a time dependent list of values per area, the parameters comprising the Doppler frequency shift and time offset per candidate cell, wherein the Doppler shift information further comprises an indication of the associated cell, Doppler area and validity, and wherein the Doppler shift information is indicated per area for different UE speed and direction ranges.

7. The apparatus according to claim 6, wherein the broadcast signalling is broadcast per the at least one area.

8. The apparatus according to claim 6, wherein the at least one processor and the computer program code are configured to cause the apparatus to:
   receive a request for the Doppler shift information from the user equipment; and
   provide the Doppler shift information from the network to the user equipment in response to the request.

9. The apparatus according to claim 6, wherein the Doppler shift information comprises at least one set of parameters associated with a first cell, the parameters defining at least one of frequency offset and time offset of the first cell.

10. The apparatus according to claim 6, wherein the Doppler shift information comprises at least two sets of parameters, each set of parameters associated with a different area, wherein the at least one processor and the computer program code are configured to cause the apparatus to:
    receive an indication from the user equipment of the set of parameters used in communication with the network.

11. A method comprising:
    receiving from a network, at a user equipment, Doppler shift information associated with at least one cell of the network as a function of time for at least one area; and
    using the Doppler shift information at the user equipment to compensate for the Doppler shift in communication with the network when the user equipment is in the at least one area,
    wherein the method further comprises:
    receiving the Doppler shift information from the network using radio resource control signalling, broadcast signalling, multicast signalling and groupcast signalling, wherein the broadcast signalling is broadcast per the at least one area;

determining Doppler shift information associated with the at least one cell for the at least one area; and providing the determined Doppler shift information to the network, wherein the Doppler shift information comprises a set of Doppler compensation parameters comprising a time dependent list of values per area, the parameters comprising the Doppler frequency shift and time offset per candidate cell, wherein the Doppler shift information further comprises an indication of the associated cell, Doppler area and validity, and wherein the Doppler shift information is indicated per area for different UE speed and direction ranges.

12. The method of claim 11, further comprising:

receiving from a network, at a user equipment, Doppler shift information associated with at least one cell of the network as a function of time for at least one area; and using the Doppler shift information at the user equipment to compensate for the Doppler shift in communication with the network when the user equipment is in the at least one area.

\* \* \* \* \*